United States Patent [19]

Smith et al.

[11] Patent Number: 5,559,625
[45] Date of Patent: Sep. 24, 1996

[54] DISTRIBUTIVE COMMUNICATIONS NETWORK

[75] Inventors: Phillip J. Smith; David W. Faulkner, both of Suffolk, United Kingdom

[73] Assignee: British Telecommunications public limited company, London, England

[21] Appl. No.: 403,744

[22] PCT Filed: Sep. 8, 1993

[86] PCT No.: PCT/GB93/01898

§ 371 Date: Apr. 21, 1995

§ 102(e) Date: Apr. 21, 1995

[87] PCT Pub. No.: WO94/07340

PCT Pub. Date: Mar. 31, 1994

[30] Foreign Application Priority Data

Sep. 14, 1992 [EP] European Pat. Off. .............. 92308356

[51] Int. Cl.⁶ ..................................................... H04J 14/02
[52] U.S. Cl. ........................... 359/125; 359/118; 359/121
[58] Field of Search ..................................... 359/110, 118, 359/120–121, 125, 164, 173; 370/71–73, 94–3, 120

[56] References Cited

U.S. PATENT DOCUMENTS

| 4,809,362 | 2/1989 | Claus et al. | 359/120 |
|---|---|---|---|
| 4,821,255 | 4/1989 | Kobrinski | 320/3 |
| 5,341,232 | 8/1994 | Popp | 359/121 |
| 5,351,146 | 9/1994 | Chan et al. | 359/118 |

FOREIGN PATENT DOCUMENTS

| WO A9210770 | 6/1992 | WIPO . | |

OTHER PUBLICATIONS

Hill, "A Wavelength Approach to Optical Communications Networks", Proceedings, IEEE Conference on Computer Communications, 27–31 Mar. 1988, pp. 354–362, New Orleans US.

Wagner et al., "WDM Applications in Broadband Telecommunications Networks", IEEE Communications Magazine, Vol. 29, No. 3, Mar. 1989, Piscataway, NJ US.

Wailes et al., "Multiple Channel Architecture: a New Optical Interconnection Strategy for Massively Parallel Computers", Journal of Lightwave Technology, Vol. 9, No. 12, Dec. 1991, New York US.

Hill et al., "Evolutionary Wavelength Division Multiplexed Schemes for Broadband Networks", Technical Digest, 10th Optical Fiber Communication Conference, 19–22 Jan. 1987, p. 30, Reno US.

Karol, "Exploiting the Attenuation of Fiber–Optic Passive Taps to Create Large High Capacity LANs and MANs", Journal of Lightwave Technology, Vol. 9, No. 3, Mar. 1991, New York US, pp. 400–408.

Primary Examiner—Leo Boudreau
Assistant Examiner—Kinfe-Michael Negash
Attorney, Agent, or Firm—Nixon & Vanderhye P.C.

[57] ABSTRACT

A distributive communications network includes groups of nodes at different levels. Each set of nodes at one level is connected to an associated node in the level above for transmission and reception of traffic. Traffic is assigned to one of a number of bands of wavelengths according to whether it is local or wider area traffic. At the first level of node local area traffic in the corresponding band of wavelengths is looped back and retransmitted to all of the terminals that are connected to that node. At each level of node, traffic is either passed on to a higher level, or looped back according to the band of wavelengths to which it is assigned. Thus, the wavelength band determines the node level at which the traffic is looped back, and the breadth of terminals ultimately exposed to this traffic. It is possible to re-use bands of wavelengths for communicating between terminals.

18 Claims, 2 Drawing Sheets

DISTRIBUTIVE COMMUNICATIONS NETWORK

BACKGROUND OF THE INVENTION

1. Field of the Invention

This invention relates to a distributive communications network, and to a node therefor. The invention is particularly applicable to an optical fibre network.

2. Related Art

The existing 'fixed access' networks, such as public switched telephone networks (PSTNs) and cable television networks, fall into two distinct topologies driven by different customer requirements. A PSTN has a 'star' topology with a central node or exchange and a tiered access structure. It is designed for bi-directional real-time speech communications. Cable television networks have been developed to provide unidirectional (broadcast) services to customers. They have a 'tree-and-branch' or switched star topology.

A known distributive communications network node has a first input path, and power divider means connected with the first input path and arranged to split incoming traffic on the first input path along a local output path and a wider area output path.

It has been recognized that it would be desirable to be able to provide an integrated broadband switched network for applications ranging from basic telephony through to data and high definition television signal transmission. One result of this recognition is the broadband integrated services digital network (B-ISDN). However, a significant factor, neglected by most B-ISDN studies, is the cost of implementing the necessary transmission and switching infrastructure for a national system.

Known optical broadband telecommunication networks utilize wavelength division multiplexing (WDM) techniques (see IEEE Communications Magazine, Vol. 29, No. 3, March 1989, pages 22 to 30, and Journal of Lightwave Technology, Vol. 9, No. 12, December 1991, pages 1702 to 1716).

SUMMARY OF THE INVENTION

The aim of the invention is to increase the amount of re-use of information transmission wavelengths within a network, while not incurring the disadvantage of multipath effects which can otherwise arise in wavelength re-use.

The present invention provides a distributive communications network comprising n access levels of nodes, each node comprising a first input path, power divider means connected with the first input path and arranged to split incoming traffic on the first input path along a local output path and a wider area output path, a second input path, and power coupler means arranged to combine traffic from the second input path with traffic on the local output path, wherein filter means are arranged in one or both output paths, the filter means being arranged to discriminate between relatively local area traffic in a first band of wavelengths ($\lambda_x$) and wider area traffic in a second band of wavelengths ($\Sigma\lambda-\lambda_x$), and to allow the local area traffic along the local output path and the wider area traffic along the wider area output path, and wherein each node has:

a. its first input path connected with a plurality of user terminals (a-x) or with the wider area output paths of associated nodes at a lower access level;

b. its local output path connected with the associated user terminals or with the second input paths of the associated lower access level nodes; and c. its wider area output path connected with the first input path of an associated node at a higher access level, each user terminal being operable at n different wavelengths, the ith wavelength of which being used for communication with any other user terminal via an ith level node, where i=1 to n.

The invention also provides a node for incorporation in a distributive communications network as defined above, the node comprising a first input path, power divider means connected with the first input path and arranged to split incoming traffic on the first input path along a local output path and a wider area output path, a second input path, and power coupler means arranged to combine traffic from the second input path with traffic on the local output path, characterized by filter means in one or both output paths, the filter means being arranged to discriminate between relatively local area traffic in a first band of wavelengths ($\lambda_x$) and wider area traffic in a second band of wavelengths ($\Sigma\lambda-\lambda_x$), and to allow the local area traffic along the local output path and the wider area traffic along the wider area output path.

In a practical implementation of, for example, a national network, there is a number of levels of nodes providing access to increasingly distant 'local' nodes.

The distributive communications network of the invention permits the provision of a relatively economical switched network architecture that minimizes the number of complex switching sites and, therefore, the associated capital, equipment and management costs. It is also provides a switched network architecture that is able to increase the efficiency of any central switching, by concentrating central switching in a reduced number of switching facilities to provide smoother aggregated traffic throughput.

The distributive network of the invention allows traffic in a selected band of wavelengths to travel as far as a particular level of nodes. According to the band to which it is assigned, traffic will be passed or looped back at a particular level. Where it is looped back, traffic is applied to all the associated lower level nodes and, through them, to the terminal equipment, at a distance determined by the level of node at which it is looped back. Being a distributive network, the intended destination of the traffic will be provided by address information in each message, although all terminals accessible by the node at which the traffic is looped back will be exposed to the message.

By means of the invention, it is possible to use a band of wavelengths in one local area network that will be looped back at a first (local) level of node, and applied to all the terminals associated with that node. Similarly, a neighboring local area network will be equally able to re-use the same band independently, because the bands will be isolated from each other by always being looped back at the first layer. Re-use of the same band is, therefore, possible among all local area networks because the band is looped back at the first level of nodes.

Similarly, a further band of wavelengths can be used to support traffic for an intermediate, as opposed to local, destination. According to the invention, the further band of wavelengths is allowed to pass the local or first level of node, to which the traffic from an associated originating terminal is applied, and is then looped back at the second level of node which has access to the terminals of the node associated with the original terminal as well as those terminals of other first level nodes connected with the second level node at which the traffic is looped back.

Thus, at each level, it is possible to re-use the same wavelength bands in adjacent nodes associated with the looping back of traffic at that level.

Preferably, the network is an optical fibre network supporting, for example, traffic in bands of wavelengths centered on 1300 nm or 1500 nm. In this case, the power divider means may include a passive optical device having a splitter and a band pass filter for discriminating between bands of wavelengths.

In a particular embodiment of the invention, each node comprises a first passive optical network arranged to receive signals from a plurality of user access points associated with the node, a second passive optical network arranged to transmit signals from the plurality of user access points associated with the node, and a band pass filter connecting the output of the first passive optical network with the input to the second passive optical network. It is desirable that an amplifier be connected between the first passive optical network and the band pass filter, and/or between the band pass filter and the second passive optical network, in order to boost the local area signal looped back to the user access points associated with the node.

Preferably, the nodes are arranged into access levels, each containing groups of nodes operably connected with nodes at higher and lower levels.

Advantageously, the network further comprises failure protection means comprising an auxiliary connection between a first node at one level and a second node at a lower level, the second node being associated with a node which is a neighbour of the first node at said one level, and means responsive to a failure at, or in the path to, said neighbouring node to re-direct traffic from the second node to the first node for transmission to the nodes and/or user access points for which the traffic was originally intended. In this case, the means responsive to a failure may also reassign the re-directed traffic to a different band of wavelengths for subsequent transmission.

BRIEF DESCRIPTION OF THE DRAWINGS

The present invention can be put into practice in various ways, one of which will now be described, by way of example, with reference to the accompanying drawings, in which.

DETAILED DESCRIPTION OF EXEMPLARY EMBODIMENTS

Figure 1:
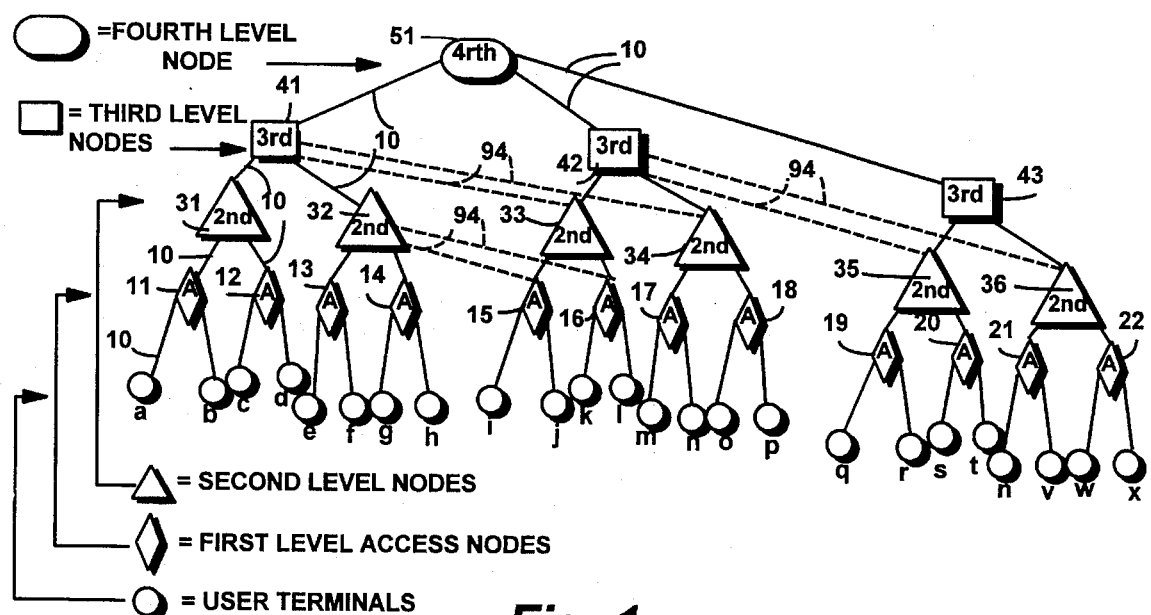
FIG. 1 is a block diagram of a hierarchical distributive network for use with the invention.

Referring to the drawings, FIG. 1 shows a hierarchial distributive network comprising user terminals a-x. For simplicity, pairs of terminals are linked by pairs of (transmit and receive) optical fibres to respective access nodes 11 to 22 (marked "A" in FIG. 1). Pairs of transmit and receive fibres connecting nodes at different levels, and terminals with first level nodes, are denoted by single bi-directional lines 10. It will be appreciated that a practical network will have hundreds, or even thousands, of user terminals all associated with the same node 11, etc. Each pair of first level nodes 11 and 12 (for example) is connected, by pairs of optical fibres 10, to a common second level node 31–36. Again, many first level nodes would be grouped to each second level node in practice.

Similarly, pairs of second level nodes 31 and 32 (for example) are connected, by pairs of optical fibres 10, to a common third level nodes 41–43. These are, in turn, connected to a common fourth (and highest) level node 51, also by pairs of optical fibres 10.

Figure 2:
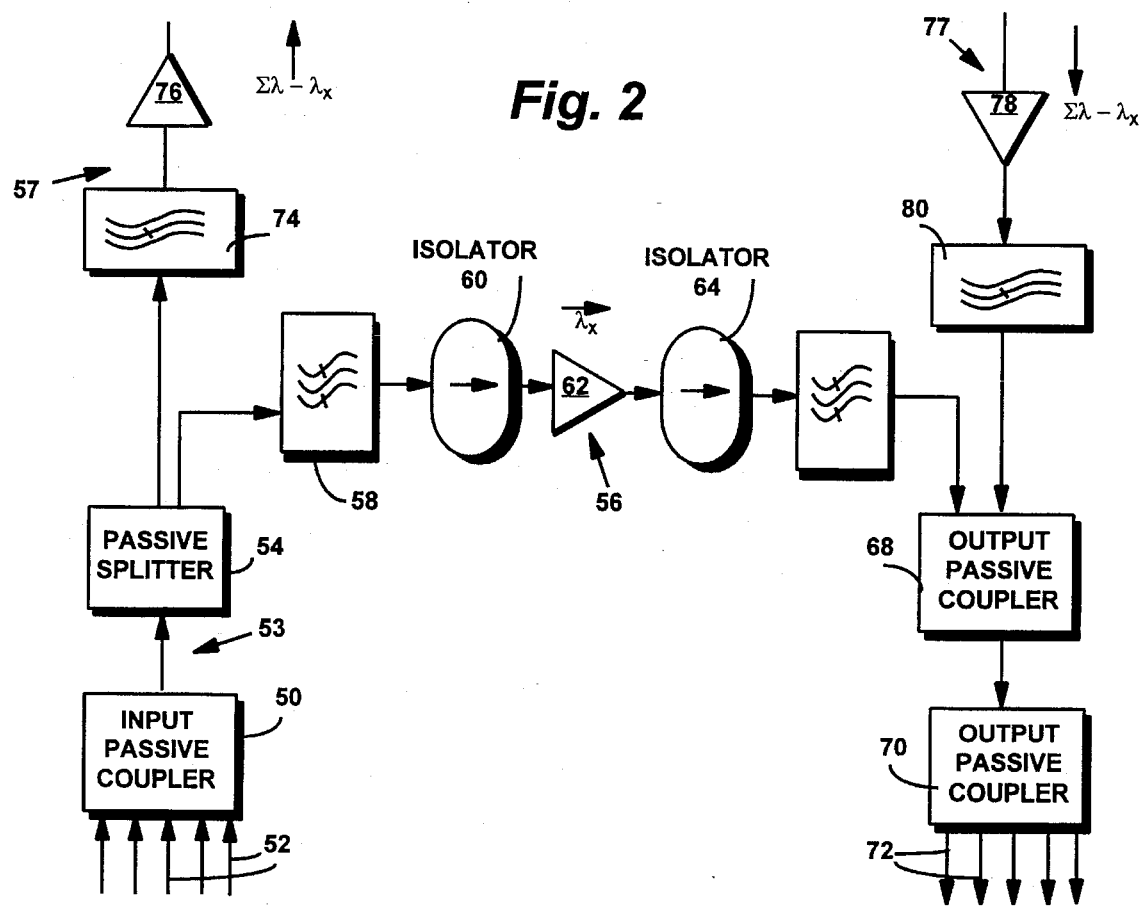
FIG. 2 is a diagram of an access network acting as a node in the hierarchical network of FIG. 1.

An access network based on passive optical networks and constituting a node is illustrated in FIG. 2. This network comprises an incoming input passive coupler 50 combining the outputs of transmit optical fibres 52 from lower level nodes or user interface equipment.

The output from the input passive coupler 50 constitutes a first input path 53 of the node. The input path 53 is divided along two paths 56 and 57 by a passive splitter 54. Along the path 56, the output from the splitter 54 is applied to a band pass filter 58 which passes traffic in a band of wavelengths $\lambda_x$ intended for transmission to the lower level nodes and/or user access terminals accessible by the node. This path 56 is termed a 'loop-back' path.

The passed band of wavelengths $\lambda_x$ is then applied to an isolator 60 and an optical amplifier 62. The boosted signal output from the amplifier 62 is passed through a further isolator 64 and a further band pass filter 66. The isolators 60 and 64 are present to prevent reflections of the band of wavelengths $\lambda_x$ affecting the output from the splitter 54. The two band pass filters 58 and 66 are used to optimise the attenuation of the rejected bands of wavelengths. One isolator and/or one band pass filter, on either side of the amplifier 62, could be used.

The looped back information in the wavelength band $\lambda_x$ is then applied to an output passive coupler 68 to which all local traffic in the wavelength band $\lambda_x$, and that in other wavelengths bands $\Sigma\lambda-\lambda_x$ from non-local parts of the network, are passed for transmission to lower levels associated with the node. The output from the coupler 68 is split in a passive splitter 70 among receive optical fibres 72 which lead to lower level nodes or user interface equipment.

Along the output path 57, the output from the splitter 54 is applied to a band stop filter 74 which passes all wavelength bands except the band $\lambda_x$ passed by the band pass filter 58. These wavelengths $\Sigma\lambda-\lambda_x$ are transmitted to a node in the next higher level in the network after amplification by an optical amplifier 76.

Traffic from the node on the next higher level in the same set of wavelengths $\Sigma\lambda-\lambda_x$ is also received at the node via a second input path 77 of the node. The traffic on the path 77 passes through an optical amplifier 78 and a band stop filter 80 (which is substantially the same as the filter 74). The traffic in the set of wavelengths $\Sigma\lambda-\lambda_x$ is then combined with the looped back traffic, from the band pass filter 66, by the output passive coupler 68.

Figure 3:
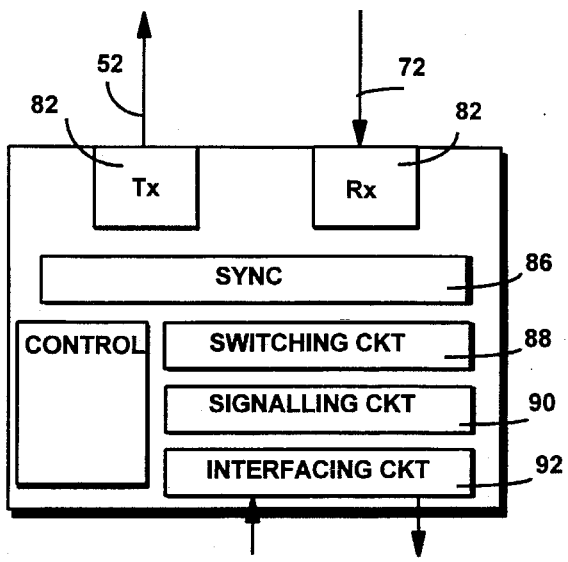
FIG. 3 is a block diagram of a network user interface node.

FIG. 3 shows a user access terminal which comprises a transmitter 82 connected to a transmit fibre 52, and a receiver 84 connected to a receive fibre 72. The fibres 52 and 72 are both connected with the associated node on the first level, i.e. the node 11 or 12, etc. Each terminal comprises conventional circuitry synchronisation circuitry 86 (for locking either to a standard clock, frequency or wavelength), switching circuitry 88, signalling circuitry 90 and interfacing circuitry 92 for conditioning the incoming and outgoing traffic. Traffic is transmitted in a waveband selected in accordance with the level of node it will have to reach in order for it to gain access to the sub-network associated with its intended address. The transmitter 82 may have separate transmitters for each waveband, or it may be a tunable element. The receiver 84 has either a series of separate receivers tuned to the wavelengths associated with the various levels of access to which it is exposed, or it is a tunable receiver which is adjusted in response to coded instructions in the address tuned to the correct frequency.

Referring back to FIG. 1, the network of the invention relies on wavelength routing and re-use. By the technique described, it is possible to limit the number of wavelengths required by the network as a whole by enabling the equivalent, but isolated, sub-networks associated with separate nodes at the same level to use identical wavelength bands as neighbouring sub-networks for penetrating the network to the same extent.

For network protection, it is possible to employ wavelength duplication and routing on auxiliary protection routes. If a network node (or link between nodes) fails, then traffic can be protected by duplicating the wavelengths which are able to pass through the node in question onto protection or standby wavelengths which are programmed to be routed to nodes at the next layer up on a neighbouring sub-network for onward transmission, following a non-faulty path. Auxiliary routing is illustrated on two different levels in FIG. 1 by broken lines 94, denoting bi-directional paths between the nodes 15 and 16 and the node 32, between the nodes 33 and 34 and the node 41, and between the nodes 35 and 36 and the node 42.

Alternatively, more conventional network protection switching, node duplication and/or routing duplication may be used to protect message transmission. For example, optical amplifiers may be switched on by means of a suitable optical or electronic source signal to enable an alternative predetermined communication path.

For normal communications across the network, a set of wavelengths is assigned. For example, communications which need to go via level 1 nodes only are assigned wavelength $\lambda_1$, communications which go via level 2 nodes are assigned wavelength $\lambda_2$, communications which go via level 3 nodes are assigned wavelength $\lambda_3$, and communications which go via level 4 nodes are assigned wavelength $\lambda_4$. Examples of each type of communications are illustrated in the following table:

| Terminal Pair | Wavelength |
| --- | --- |
| Level 1 Communications | |
| a–b | $\lambda_1$ |
| c–d | $\lambda_1$ |
| e–f | $\lambda_1$ |
| g–h | $\lambda_1$ |
| Level 2 Communications | |
| a–c | $\lambda_2$ |
| a–d | $\lambda_2$ |
| f–g | $\lambda_2$ |
| f–h | $\lambda_2$ |
| Level 3 Communications | |
| a–e | $\lambda_3$ |
| a–f | $\lambda_3$ |
| j–n | $\lambda_3$ |
| j–o | $\lambda_3$ |
| Level 4 Communications | |
| a–i | $\lambda_4$ |
| a–j | $\lambda_4$ |
| j–s | $\lambda_4$ |
| n–t | $\lambda_4$ |

If a level 3 node fails, then it is desirable to protect all the traffic passing through that node. In this hierarchical network design, a protection strategy translates into protecting the wavelengths which travel through thaT level 3 node by using an alternative route.

A wavelength plan is desirable in any implementation of the network. Allocations of networks can then be determined on the basis of traffic and reliability requirements and other factors, such as security requirements. A typical wavelength plan could be as follows:

| Wavelength | Function |
| --- | --- |
| $\lambda_1$ | Normal transmission via a level 1 node |
| $\lambda_2$ | Normal transmission via a level 2 node |
| $\lambda_3$ | Normal transmission via a level 3 node |
| $\lambda_4$ | Normal transmission via a level 4 node |
| $\lambda_{31}$ | Protection against level 3 node failure |
| $\lambda_{41}$ | Protection against level 4 node failure |

Protection wavelengths would duplicate the wavelengths $\lambda_3$ and $\lambda_4$ and be assigned the wavelengths $\lambda_{31}$ and $\lambda_{41}$. These protection wavelengths $\lambda_{31}$ and $\lambda_{41}$ are routed on the protection routes as indicated by the broken lines 94 in FIG. 1, and do not traverse the normal routes traversed by the wavelengths $\lambda_3$ and $\lambda_4$. The protection routes are passed to the input of another node at the same hierarchical level as the node being protected.

For example, if the node 42 were to fail, then the traffic passing through it on wavelengths $\lambda_3$ and $\lambda_4$ would be protected by the wavelengths $\lambda_{31}$ and $\lambda_{41}$ which pass across the protection routes to the node 41. This allows the re-use of wavelengths for protection purposes in a similar manner to the re-use of wavelengths for normal communications. Protection routes must not be allowed to 'cross over' so as to avoid multi-path effects. This method of protection against failure can be applied to any node in any level of the network, and it is possible to re-use wavelengths across the network for failure routing in a similar manner to normal communications.

Protection re-routing will depend on the existing auxiliary routing in place, as well as the level at which a fault occurs. Not all nodes will require the same level of protection. Alternatively, one node could act as the stand-in node for re-routed traffic for more than one node on the same level. For example, a node (say the node 33) at one level in the structure of network illustrated in FIG. 1 has protection re-routing by means of the bi-directional auxiliary links from its associated nodes at the next level down (i.e. the nodes 15 and 16 and any other associated node similarly connected to the node 33) to a neighbouring stand-in node (i.e. the node 32) at the same level as that for which fault protection is provided.

As far as the re-routing path is concerned, the stand-in node (i.e. the node 32) will receive the re-routed traffic on the allocated re-routing wavelength. The wavelength will depend on the level to which the traffic has to be sent in order for it to cascade down to reach the intended destination. Depending on the wavelength, each node to which the re-routed traffic is passed in turn will either pass on or loop back the traffic as necessary. For example, a re-routed message from the terminal i intended for the terminal p, when the node 33 is faulty, can be allocated a level 3 wavelength. The message passes from the node 15 to the node 32 and then on to the node 41. At this level 3, the message is looped back along the other auxiliary paths connecting the nodes 33 and 34 to the node 41, as well as the primary connections to the nodes 31 and 32. Thus, the message sent to the node 34 on its auxiliary link will reach the terminal p through the node 18.

If the auxiliary links between the node 41 and the node 34 did not exist (for example, because protection of traffic reaching the node 42 was not required by this means), or was established as an additional means of re-routing the message from the terminal i to the terminal p, the re-routed message would have to be allocated a level 4 wavelength such that it reached the terminal p via the nodes 15, 32, 41, 51, 42, 34 and 18.

It will be clear that such auxiliary re-routing can undermine the effective isolation of the sub-networks of the basic network which allow the re-use of the wavelength bands for accessing different levels. Thus, care has to be exercised in assigning wavelengths for re-routing to avoid exposing a terminal to more than one message on the same wavelength from different sources.

Although only pairs of nodes are illustrated as cascaded from the nodes at levels 2 and 3, many more than this are likely to be connected to each node in practice, in the same way as more than two terminals will be connected to each node at level 1. To the same extent, a node acting as a stand-in (for example the node 32) for a node at the same level will service the number of nodes (15, 16, etc) associated with the protected node (33).

It is also possible to provide automatic protection, with no loss of information, by a terminal transmitting its traffic using the normal wavelength and the protection wavelength simultaneously. For example, the terminal q when talking to the terminal x would normally use the wavelength $\lambda_3$. However, it could simultaneously transmit on $\lambda_{31}$. In the event of the node 43 failing, the message would disappear on the wavelength $\lambda_3$, but could still be present on the wavelength $\lambda_{31}$. This facility could be used by terminals requiring particularly reliable transmission, or for links which the network itself requires to be highly reliable.

Figure 4:
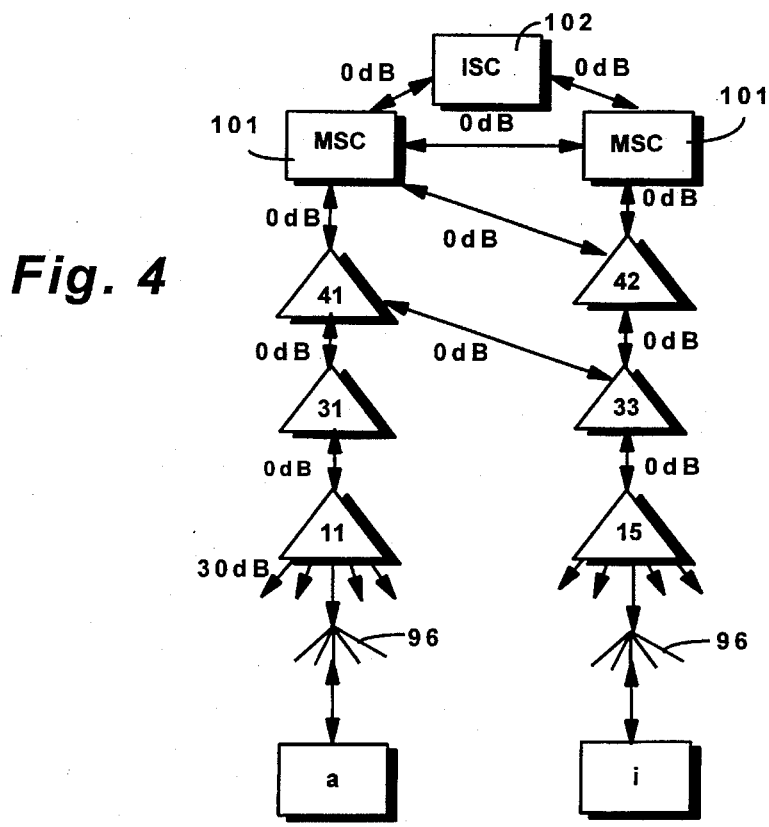
FIG. 4 is an illustration of a hierarchial distributive network combining switching centres.

The network of FIG. 4 is an adaptation of that in FIG. 1, but it is modified to provide both distributive switching according to the invention and centralised switching. A pair of user terminals a and i are illustrated from an exemplary network based on that in FIG. 1. The associated nodes 11, 15, 31, 33, 41 and 42 at different levels are similarly identified. It will be noted that the network illustrates line concentrators 96 downstream of the nodes 11 and 15.

In this example of a network according to the invention, there is no equivalent to the level 4 of FIG. 1. Here, interconnection at the equivalent of level 4 is effected by means of main (cross-point) switching centres (MSCs) 101. One reason for recourse to cross-point switching might be a lack of available wavelength capacity. Another reason might be the need to interface with an incompatible network. In FIG. 4, this is the case at the international switching centre (ISC) 102 at which the national network according to the invention has to be connected to an incompatible national network of another country.

The traffic volume entering an MSC 101 is likely to be considerable. For example, in the case of 1 million business lines per MSC, each transmitting 2 Mbit/sec at 0.1 Erlang, the traffic volume would be 200 Gbit/sec. The maximum capacity on a single optical fibre is 40 Gbit/sec, using 16 wavelengths with 2.5 Gbit/sec capacity. Even without concentration, a 12-fibre connection with the MSC 101 would be sufficient to transmit traffic into and out of the MSC.

The invention provides a distributively switched access network (DSAN) with flexibility to allow growth by frequency re-use. The need for cross-point switches is also limited to interfaces, such as international exchanges and, possibly, interfaces with main national optical networks, by using the network itself as a distributive switch. The PON-based DSAN-network is able to support an optical path loss in excess of 20 dB between node and customer. Such a network may support all data rates in the range 2 to 34 Mbit/sec in both synchronous and packet-based modes. With a total network capacity of 2.5 Gbit/sec, 64 kbit/sec usage would allow a network capacity of 155 Mbit/sec for a 10,000 line system.

The network according to the invention can be used to support time domain multiplexing (TDM), wavelength division multiplexing (WDM), frequency division multiplexing (FDM) or code division multiplexing (CDM) or any combination to achieve distributive switching addressing.

Asynchronous Transfer Mode (ATM) and Synchronous Transfer Mode (STM) are particular forms of information transport associated with TDM which are, of course, supportable by the network.

We claim:

1. A distributive communications network comprising:

n access levels of nodes, each node comprising a first input path, power divider means connected with the first input path and arranged to split incoming traffic on the first input path along a local output path and a wider area output path, a second input path, and power coupler means arranged to combine traffic from the second input path with traffic on the local output path, wherein filter means are arranged in one or both output paths, the filter means being arranged to discriminate between relatively local area traffic in a first band of wavelengths and wider area traffic in a second band of wavelengths, and to allow the local area traffic along the local output path and the wider area traffic along the wider area output path, and wherein each node has:

(a) its first input path connected with a plurality of user terminals or with the wider area output paths of associated nodes at a lower access level;

(b) its local output path connected with the associated user terminals or with the second input paths of the associated lower access level nodes; and (c) its wider area output path connected with the first input path of an associated node at a higher access level, each user terminal being operable at n different wavelengths, the ith wavelength of which being used for communication with any other user terminal via an ith level node, where i=1 to n.

2. A network as in claim 1, in which each node has its second input path connected with an associated higher access level node.

3. A network as in claim 1 in which connections between the nodes, and between the nodes and the user terminals are by means of optical fibres.

4. A network as in claim 1 further comprising:

a top level node above the nodes of the highest access level, the top level node having an input path connected with the wider area output paths of the highest access level nodes, and an output path connected with the second input paths of the highest access level nodes.

5. A network as in claim 1 further comprising:

failure protection means comprising an auxiliary connection between a first node at one level and a second node at a lower level, the second node being associated with a node which is a neighbour of the first node at said one level, and means responsive to a failure at, or in the path to, said neighbouring node to re-direct traffic from the second node to the first node for transmission to the nodes and/or user terminals for which the traffic was originally intended.

6. A network as in claim 5, in which the means responsive to a failure are arranged to re-assign the re-directed traffic to a different band of wavelengths for transmission along the auxiliary connection.

7. A network as in claim 6, in which the network is arranged to re-use the same band of wavelengths for transmitting re-directed traffic between pairs of nodes at the same respective levels.

8. A node for incorporation in a distributive communications network as in claim 1, the node comprising:

a first input path, power divider means connected with the first input path and arranged to split incoming traffic on the first input path along a local output path and a wider area output path, a second input path, power coupler means arranged to combine traffic from the second input path with traffic on the local output path, and filter means in one or both output paths, the filter means being arranged to discriminate between relatively local area traffic in a first band of wavelengths and wider area traffic in a second band of wavelengths, and to allow the local area traffic along the local output path and the wider area traffic along the wider area output path.

9. A node as in claim 8, further comprising:

amplifier means connected with one or both of the output paths from the power divider means.

10. A node as in claim 8 in which the filter means are constituted by a band pass filter in the local output path to isolate the local area traffic.

11. A node as in claim 8 in which the filter means includes a band stop filter in the wider area output path to isolate the wider area traffic.

12. A network as in claim 8 in which the power divider means and the power coupler means are passive optical devices.

13. A method of selectively communicating information to a local area or a wider area on a distributive communications network, the network comprising a plurality of access levels of nodes, each node comprising a first input path, power divider means connected with the first input path and arranged to split incoming traffic on the first input path along a local output path and a wider area output path, a second input path, and power coupler means arranged to combine traffic from the second input path with traffic on the local output path, wherein filter means are arranged in one or both output paths, the filter means being arranged to discriminate between relatively local area traffic in a first band of wavelengths and wider area traffic in a second band of wavelengths, and to allow the local area traffic along the local output path and the wider area traffic along the wider area output path, and wherein each node has:

(a) its first input path connected with a plurality of user terminals (a-x) or with the wider area output paths of associated nodes at a lower access level;

(b) its local output path connected with the associated user terminals or with the second input paths of the associated lower access level nodes; and (c) its wider area output path connected with a first input path of an associated node of a higher access level, the method comprising the steps of:

transmitting relatively local area traffic within a first band of wavelength and transmitting wider area traffic within a second band of wavelengths, by filtering at each node to discriminate between the local area traffic and the wider area traffic on its input path, applying the local area traffic on the local area output path to the associated user terminals or to the second input paths of the associated lower access level nodes, and applying the wider area traffic on its wider area output path to the first input path of an associated node at the higher access level, wherein each user terminal is operable at n different wavelengths, the ith wavelength of which being used for communication with any other user terminal via an ith level node, where i-1 to n.

14. A method as in claim 13, in which:

each given node at one access level is associated with nodes at a lower level to transmit local area traffic, and said given node is associated with a node at a higher access level, in common with neighbouring nodes at the same level as said given node, to transmit the wider area traffic, the same band of wavelengths being re-used for the transmission of traffic from nodes at one level to their respective associated nodes at a higher level.

15. A method as in claim 13 further comprising the step of:

transmitting the wider area traffic from a first node at one level to a second node at a higher level, the second node being associated with a node which is a neighbour of the first node at said higher level, in response to a failure at, or in the path to, said neighbouring node to re-direct traffic from the second node to the first node for transmission to the nodes and/or user terminals for which the traffic was originally intended.

16. A method as in claim 15, further comprising the step of re-assigning the redirect traffic to a different band of wavelengths.

17. A method as in claim 16, further comprising the step of re-using the same band of wavelengths for transmitting re-directed traffic between pairs of nodes at the same respective levels.

18. A method as in claim 13, further comprising the step of transmitting the local and wider area traffic along optical fibres.

* * * * *